United States Patent [19]
Hauck

[11] Patent Number: 5,877,932
[45] Date of Patent: *Mar. 2, 1999

[54] INNER LINING FOR TANKS CONTAINING LIQUIDS, IN PARTICULAR GASOLINE, AND A TANK MADE WITH IT

[75] Inventor: Erich Hauck, Kaufungen, Germany

[73] Assignee: Wuelfing+Hauck GmbH+Co. KG, Kaufungen, German

[ * ] Notice: This patent issued on a continued prosecution application filed under 37 CFR 1.53(d), and is subject to the twenty year patent term provisions of 35 U.S.C. 154(a)(2). y

[21] Appl. No.: 696,330

[22] Filed: Aug. 13, 1996

[30] Foreign Application Priority Data

Aug. 14, 1995 [DE] Germany ................. 295 13 086 U
May 29, 1996 [DE] Germany ................. 196 21 469.6

[51] Int. Cl.$^6$ ................. B65D 90/50; B65D 90/04; H05F 3/02
[52] U.S. Cl. ................. 361/215; 361/212
[58] Field of Search ................. 361/212, 215, 361/220, 216, 217; 428/35.4, 36.6, 408; 220/88.1, 4.12–4.15, 454, 456, 457, 461, 470; 280/832

[56] References Cited

U.S. PATENT DOCUMENTS

| | | |
|---|---|---|
| 1,524,423 | 1/1925 | Chapman ................. 361/215 |
| 3,691,620 | 9/1972 | Harr ................. 220/88 |
| 3,811,460 | 5/1974 | Capdevielle et al ................. 220/22 |
| 4,230,061 | 10/1980 | Roberts et al. ................. 220/457 |
| 4,613,922 | 9/1986 | Bachmann . | |
| 5,261,764 | 11/1993 | Walles ................. 220/469 |
| 5,265,465 | 11/1993 | Thomas ................. 73/49.2 |
| 5,498,372 | 3/1996 | Hedges ................. 252/511 |
| 5,514,299 | 5/1996 | Kalwara ................. 220/88.1 |
| 5,589,241 | 12/1996 | Stiles et al. ................. 220/454 |

FOREIGN PATENT DOCUMENTS

| | | |
|---|---|---|
| 0069303 | 6/1982 | European Pat. Off. . |
| 0571868A1 | 12/1993 | European Pat. Off. ........ B65D 90/04 |
| 693 37 614 | 1/1970 | Germany . |
| 76 17 733 | 10/1976 | Germany . |
| 76 27 844.9 | 1/1977 | Germany . |
| 9109544 | 1/1992 | Germany . |
| 9311620 | 11/1993 | Germany . |
| 94 17 151 U1 | 2/1996 | Germany . |
| 487046 | 2/1969 | Switzerland . |

OTHER PUBLICATIONS

"Beschichten Von Polymerfolien Mit PVDC–Dispersionen", by K. Goetz, Mitteilung aus dem anwendungstechnischen Laboratorum der Sparte Dispersionen der BASF AG, Ludwishafen, Jun. 1989, s. 649–653.

Primary Examiner—Fritz Fleming
Attorney, Agent, or Firm—Michael J. Striker

[57] ABSTRACT

The inner lining for a tank holding an explosive and flammable liquid, such as gasoline, includes a gasoline-resistant inner envelope (6) and an intermediate layer (5) contacting it between the inner envelope and an interior wall of the tank. The intermediate layer (5) is air-permeable and electrically conductive. The inner envelope (6) has a diffusion-proof outer layer (6a) on its side facing the tank wall and an electrically conductive inner layer (6b) on its inside facing the interior of the tank.

18 Claims, 2 Drawing Sheets

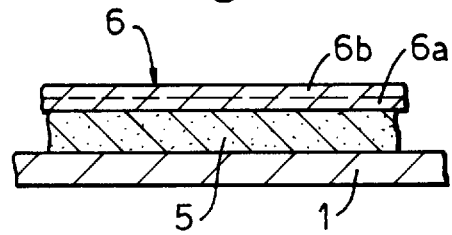
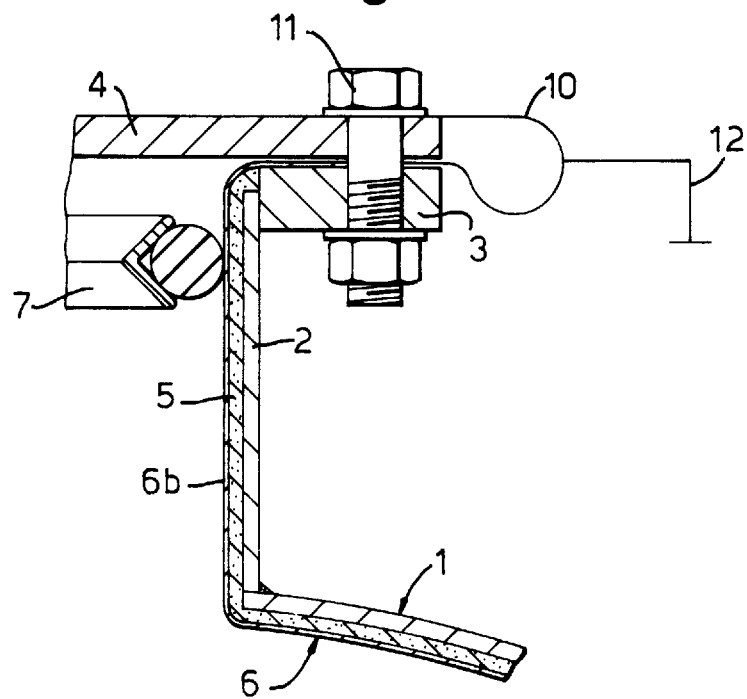

INNER LINING FOR TANKS CONTAINING LIQUIDS, IN PARTICULAR GASOLINE, AND A TANK MADE WITH IT

BACKGROUND OF THE INVENTION

The invention relates to an inner lining for tanks containing liquids, in particular gasoline tanks, comprising an intermediate layer which can be placed against the tank wall end which is air-permeable and electrically conductive, and a gasoline-resistant inner envelope resting on the intermediate layer. The invention is also concerned with a tank, particularly a gasoline tank, which is provided with such an inner lining.

Known inner linings and tanks of this type (DE 76 17 733 U1) have an electrically conducting intermediate layer or a liner made of a metallic nonwoven fabric, for example special steel wool, and an inner envelope or insert made of a gasoline-resistant material, for example nitrile caoutchouc. The intermediate layer is pervious to air and is used to maintain a minimum distance between the inner envelope and the tank wall, even if a vacuum is provided in a known manner between the inner envelope and the tank wall which, on the one hand, assures the tight adherence of the inner envelope against the tank wall and on the other hand makes a check for leaks possible.

The interior envelope is diffusion- or liquid-proof and in contrast to the PVC foils used in connection with heating oil, resistant to the gasoline to be stored. However, because it is made of nitrile caoutchouc it has several disadvantages. Since nitrile caoutchouc is a rubber-like elastic material, the inner envelope is not very well suited for tank construction, where foils are preferred, which are as easily bendable as possible, can be easily fabricated and can be welded by customary means. Furthermore, the backs of such inner envelopes are grounded via the intermediate layer. But since they are made of a material with high volume and surface resistance, the front side which comes into contact with the gasoline is not sufficiently antistatic.

This has the result that there is a danger of explosions because of unavoidable build-ups of electrical charges. Dangers of this type exist in particular when walking through a gasoline tank provided with such an inner lining, because it is then possible that sparks can be generated by frictional electricity.

Because of these deficiencies of known inner linings, no inner linings of the species recited at the outset are used today in connection with tanks for gasoline and other flammable or explosion-prone liquids. Such inner linings have not been approved an far by the competent supervisory authorities in particular, especially since the respective regulations are different. For example, on the one hand inner envelopes made of foils of a thickness of no more than 2 mm are required in connection with gasoline or the like, because supposedly ignition of materials of the explosive groups IIA and IIB in not expected up to these thicknesses. On the other had, for preventing the danger of ignition because of electrostatic charge build-up it is demanded that it must be assured by the addition of carbon black or the like, that the surface or conduction resistances are not allowed to exceed $10^9$ or $10^8$ Ohm at any place (Employers' Liability Insurance Association of the Chemical Industry, Guideline No. 4 ZH 1/200 "Static Electricity", October 1989).

Up to now, the mentioned regulations could not be met by inexpensive foils which can be processed in the customary manner in tank construction. For this reason, it is still customary today to store gasoline and similar explosive materials, for example kerosene, in double-walled tanks made of steel or the like, whose interior walls as a rule are provided with expensive, health-endangering interior layers of polyester resin or the like. For this reason the constructive and therefore also the financial outlay for producing gasoline tanks or the like in considerable.

SUMMARY OF THE INVENTION

In contrast to this, it is an object of this invention to design an inner lining which particularly is gasoline-resistant in such a manner that it can be inexpensively produced.

A further object of this invention is to provide an inner lining which is particularly useful for gasoline tanks and which has a comparatively low volume and surface resistance such that the danger of explosions because of unavoidable build-ups of electrical charges can be avoided by properly grounding it.

A further object of this invention is to provide the inner lining such that it can be processed with the means customary in tank construction, e.g. by welding.

Yet another object of this invention is to provide a tank, particularly a gasoline tank, which has the liquid-resistant, particularly gasoline-resistant inner lining mentioned above.

According to the invention an inner lining for a tank for holding a liquid, particularly an easily flammable and explosive liquid such as gasoline, is resistant to the liquid and comprises a single continuous flexible envelope prefabricated in accordance with a shape of the tank and provided with welded seams. The envelope has, on an outer side thereof, an outer layer which is diffusion-proof against diffusion of the liquid and, on an inner side thereof, an electrically conductive inner layer having a surface and conduction resistance of not greater than from $10^5$ to $10^8$ Ohms. The outer layer has a greater thickness than the electrically conductive inner layer.

The tank according to the invention has an interior tank wall and is provided with the above-described inner lining advantageously contacting the interior tank wall.

A preferred embodiment of the tank is also provided with a dome and an electrically conductive bracket passing through the dome to the outside. The electrically conductive inner layer is grounded by connection to this bracket.

The objects of the invention are attained by the above-described lining and tank.

BRIEF DESCRIPTION OF THE DRAWING

The invention will be explained in detail below by means of an exemplary embodiment in combination with the attached drawings in which:

FIG. 3 is a detailed cross-sectional view of a cutaway portion X of the tank shown in FIG. 1 showing the lining of the invention; and FIG. 4 is a detailed cross-sectional view through a cutaway portion of the gasoline tank of FIG. 1 in a region of its cover.

DESCRIPTION OF THE PREFERRED EMBODIMENTS

Figure 1:
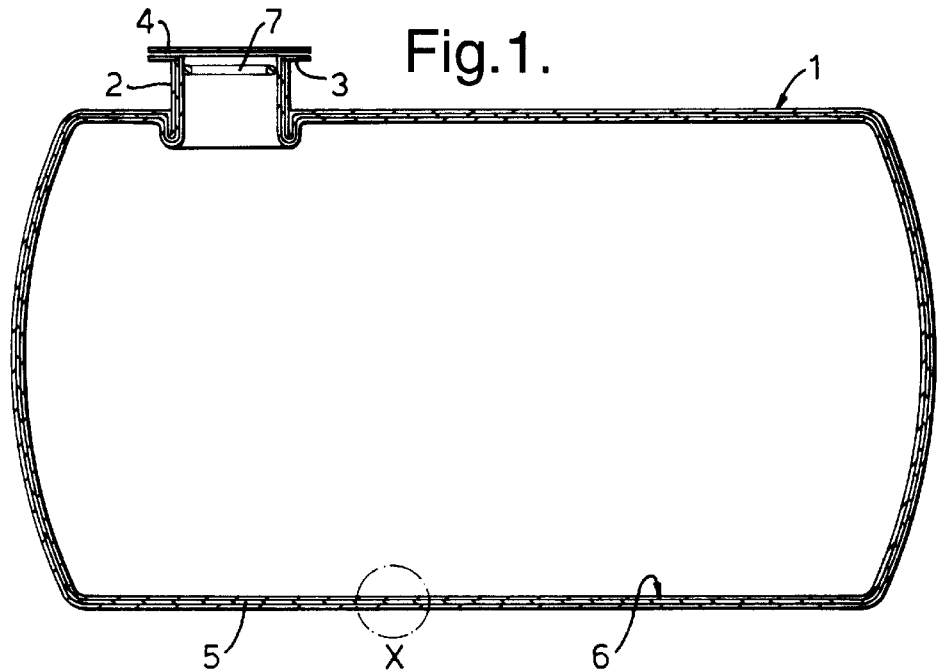
FIG. 1 is a rough schematic diagram of a gasoline tank.

A dome 2 is welded in the customary manner into the upper end of a suitable gasoline tank 1 of conventional construction. The dome 2 has a flange 3, to which a cover 4 can be screwed. An intermediate layer 5 of an electrically conducting, air permeable material rests against the interior wall of the gasoline tank 1, and a flexible inner envelope 6 rests against the inner side of the intermediate layer. As a rule, the intermediate layer 5 is replaced by a layer of sponge rubber or the like in the upper portion of the dome, so that the space between the inner envelope 6 and the tank wall is sealed toward the top. In addition, this layer is used an a support for a clamping ring 7, by means of which the inner envelope 6 is rigidly clamped in the dome 2.

Figure 2:
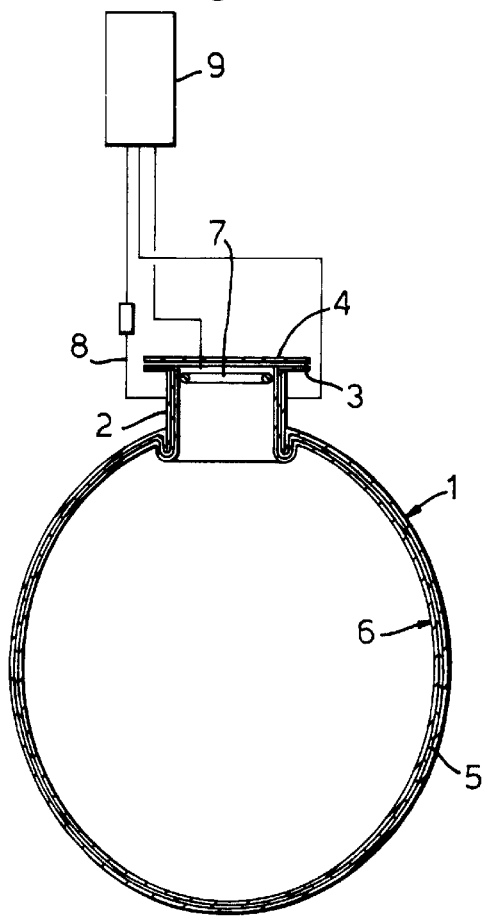
FIG. 2 is a schematic cross-sectional view through the gasoline tank in FIG. 1.

A schematically indicated, pipe-shaped angle piece 8 (FIG. 2) is applied to a suitable place of the tank wall, one end of which projects into an enlarged space formed between the tank wall and the intermediate layer 5 and which, for example, is constituted by a cover plate fastened on the angle piece 8. A suction line for producing a vacuum between the tank wall and the intermediate layer 8 is connected to the free end of the angle piece 8 and leads to a conventional leak indicating device 9, only indicated in FIG. 2.

Inner linings of this type are generally known and therefore need not be explained in detail (DE 69 37 614 U1, DE 76 17 733 U1).

In accordance with the invention the inner envelope 6 has a diffusion-proof layer 6a on its side facing the intermediate layer 5, which is resistant to the liquid to be stored, in particular gasoline. Thus, this part of the inner envelope 6 sees to the required sealing and chemical resistance. However, on its side facing the tank interior side, which comes into direct contact with the liquid, the inner envelope 6 has a layer 6b which is also gasoline-resistant and in addition has a sufficient electrical conductivity. In a useful manner this layer 6b is connected with an electrically conductive bracket 10 made of a metal or the like, which is brought to the exterior via the dome 2 and is grounded there. For this purposes the upper end of the envelope 6 is e.g., as is shown in the enlarged cross sectional view of FIG. 4, closed between the flange 3 and the cover 4 which is e.g. fastened to the flange 3 by means of a plurality of screws 11, and the bracket 10 which is e.g. made from a copper cable strand is arranged between the conductive layer 6b and the lower surface of the cover 4. The bracket 10 is e.g. coupled to the ground by means of a separate conducting line 12, but it is also possible to make the cover 4 from a well conducting material, particularly metal, and to properly ground the cover 4 as well as the tank 1 itself. If required, on its inner side the layer 6b can be additionally provided with strips of a conductive material, which improve grounding and are connected with the bracket 10. In thin way the layer 6b prevents electrical charge build-ups and spark creation in the interior of the tank 1.

It can be seen from the described embodiment of the inner envelope 6 that both layers 6a and 6b are gasoline-resistant. In addition, the layer 6a is diffusion-proof, but need not be electrically conductive. In contrast thereto, the layer 6b is electrically conductive, but need not be diffusion-proof.

Two exemplary embodiments of the inner envelope 6 are recited below.

EXAMPLE 1

The two-layered foil 6 is preferably produced from two foils by doubling, one of which has the properties of the layer 6a and the other the properties of the layer 6b. In plastic technology, "doubling" is generally understood to mean that the two foils are placed on each other by the use of pressure and heat with the aid of pressing or calendering so that they make an intimate bond.

For achieving the described properties, the basis is a foil which is sold by Wolff Walsrode AG, DE-39661 Walsrode, under the commercial name "Walopur", for example. This is a transparent, backing-free extruded foil of thermoplastic polyurethane. A foil of this type in the form of a polyurethane ester foil (for example "Walopur 2100" or "Walopur 2102") and of a thickness of 600 $\mu \pm 10\%$, for example, is employed for the layer 6a. A corresponding foil, but made of a polyurethane ether foil (for example "Walopur 2201 U"), is made electrically conductive by the addition of carbon black during its production and is used as the layer 6b at a thickness of 150 $\mu$, for example. Both foils are combined into a single foil by doubling, from which the inner envelope 6 is then made.

The described doubled foil has the advantage that it can be welded at its seams by means which are customary with tank linings, such as with heating wedge welding or HF welding, as is required when fabricating the inner envelope in correspondence with the respective shape of the tank. It is furthermore advantageous that in spite of the two layers 6a, 6b, a single connected inner envelope 6 results, i.e. only a single envelope need to be fabricated and installed in that tank. This is particularly important when lining comparatively large tanks with diameters of, for example, two meters or more and lengths of seven meters or more. A further significant advantage results in that a comparatively thick, diffusion-proof layer can be combined with a comparatively thin, electrically conductive layer. Because of this the inner envelope 6 as a whole can be made and offered at low cost, although the electrically conductive foil used for the layer 6b is relatively expensive in comparison with the diffusion-proof foil. There is the further advantage that the finished inner envelope 6 as a whole can be inflated and checked for imperviousness, such as is generally the custom with inner envelopes for heating oil tanks. Finally, the described inner envelope 6 has the particular advantage that no problem arises there due to the fact that the layer 6b is not always sufficiently diffusion-proof because of the addition of carbon black. Since the back of the layer 6b rests against the layer 6a, it is sufficient if this layer 6a in diffusion-proof. Therefore each one of the two layers 6a, 6b can be selected and produced completely in accordance with the requirements which are made on the imperviousness, on the one hand, and the electrical conductivity on the other. At the same time the inner envelope as a whole is considerably thinner than 2 mm, so that, when it is employed, the danger of explosion is low for this reason alone. It is therefore possible with the inner envelope 6 in accordance with the invention to meet all requirements which have been made so far in connection with tanks for easily flammable or explosion-endangered liquids, such as gasoline.

EXAMPLE 2

In a second embodiment of the invention, which is considered the best at this time, the described foil "Waolopur" is also made the basis for the layer 6a, and this in the form of the polyurethane ester foil "Walopur 2102 AR". Here, the thickness of the foil is 650 $\mu \pm 10\%$, so that it is diffusion-proof. A layer of an electrically conductive polyaniline is applied to the surface of this foil. This layer constitutes the electrically conductive layer 6b in FIG. 3. So far, polyaniline produced by Zipperling Kessler and Co. in DE-22904 Ahrensburg and sold under the commercial name "Versicon®" has proven to be best for this purpose ("Versicon®" is a registered trademark of Allied Signal, Inc. in Morristown, USA). In accordance with the specification sheet of September 1995, this is an intrinsically conductive polymer, which is commercially produced with a specific conductivity of approximately 5 S/cm and in a form which can be dispersed in a UV bonding lacquer and can be processed in accordance with various methods. In the conductive state the polymer has a green color. Considered chemically, the polyaniline "Versicon®" is a conjugated polymer of aniline monomers which are oxidatively coupled with each other and which was converted by means of an organic acid into a polymeric radical cation salt.

Coating of the one surface of the said foil with the polyaniline is performed by producing a dispersion of pure polyaniline in so-called UV bonding lacquer and subsequent application to the foil by wiping with a doctor blade. The produced layer is afterwards hardened by means of UV light, preferably by UV A- radiation of approximately 380 nm, or by a xenon lamp. The thickness of the applied layer 6b preferably is 2 to 100 $\mu$.

The advantages obtained by means of the inner envelope in accordance with Example 2 essentially correspond to those which were recited above in connection with Example 1.

The two described examples can be varied in that the dispersion is applied in another way, for example with the aid of a spray gun or by rotogravure. In addition, another foil, for example a fluoro-plastic foil of a thickness of 400 to 500 $\mu$, can be used as the starting material. This is in particular a foil made of a terpolymer of the three monomers tetrafluoroethylene, hexafluoropropylene and vinylidene fluoride. A fluoro-plastic foil has been shown to be particularly suitable which in offered by Nowofol Kunststoff-produkte GmbH in DE 83313 Siegodorf, among others under the names TFB 7100 and TFB 7200. Since such foils have a surface which is not sufficiently adhesive for the layer which must here be applied, the surface to be treated is first pro-treated or "activated". A particularly simple treatment method, which can be used in continuous processes and is therefore very suitable, is the corona treatment (surface bombardment with energy-rich ions in a high-tension field). It is alternatively possible to activate the surface to be coated by etching. After sufficient roughening of the surface, it in provided with a conductive layer by coating with polyaniline or carbon black in the described manner. Apart from this, a polyurethane ester foil could also be made conductive by coating one side with carbon black in that, for example, a carbon black dispersion is applied by wiping and subsequently the dispersion medium evaporated. The thickness of this layer can be 60 $\mu$.

An intermediate layer 5, which is best suited in all recited examples, preferably consists of a leak protection nonwoven material approved for heating oil tanks. Leak protection nonwovens of this type are offered, for example, by Baur Vliesstoffe GmbH, DE-91550 Dinkelsbühl, among others under the name "LSV 2", and are carded, cross-laid nonwoven sprayed on both sides. But these nonwovens are additionally made sufficiently conductive by means of carbon black, so that their conductivity is $10^3$ to $10^5$ Ohm, for example.

As the two described examples show, the inner envelope 6 in accordance with the invention has at least two layers 6a and 6b with different properties. In this case it is basically unimportant whether the two or more layers respectively consist of, for example, a separate foil or the like, as in Example 1, and are possibly firmly connected with each other into a single foil, or whether the inner envelope is produced, as in Example 2, from a single foil or the like constituting the layer 6a, for example, which is provided with a second layer 6b by surface coating, whose properties differ from that of the basic material of the fail. It would also be conceivable to provide an inner envelope made of a material which is provided with coatings on both sides which have different properties.

The coating with carbon black or polyaniline or the addition of carbon black in provided in an amount per surface unit and/or with such a thickness that the electrically conductive layer 6b has a surface and conduction resistance of at most $10^3$ to $10^6$ Ohm, and preferably of less than $10^3$ Ohm. It is assured by this that thin layer satisfied the Guidelines ZH 1/200 mentioned at the outset, for example, wherein a surface resistance of $10^9$ ohm and a conduction resistance of $10^8$ Ohm should not be exceeded in connection with a container of non-conductive or chargeable materials.

The lining in accordance with the invention in suitable for employment in stationary gasoline tanks in gas stations or the like, as well as in mobile gasoline tanks.

The invention is not limited to the exemplary embodiments described, which can be changed in many ways. This applies particularly to the materials, which are only recited by way of examples and which can be replaced by materials with the same or similar properties. For example, it is alternatively possible to use metal fiber nonwovens, known per se, or the like for the intermediate layer 5. In contrast thereto, the inner envelope 6 in accordance with Example 1 could also be made into a unit from two foils with the appropriate properties by other techniques than doubling, and in Example 2 other coating methods than the one recited can be used. In this case it would be possible, depending on the requirements and regulations, in an individual case to provide the intermediate layer 5 and/or the inner envelope 6 with additional layers with preselected properties. It is furthermore understood that in a tank provided with the inner lining in accordance with the invention the inner layer 6b of the inner envelope 6 could be grounded by other means than those described and that the intermediate layer 5 must additionally be grounded unless these are grounded steel tanks in which grounding of the intermediate layer automatically takes place via the tank wall. Finally, the described parts and their elements can also be employed in combinations other than those described and represented.

While the invention has been illustrated and described as embodied in a lining for a gasoline tank, it is not intended to be limited to the details shown, since various modifications and structural changes may be made without departing in any way from the spirit of the present invention, particularly with respect to linings for tanks which are used to store other easily flammable and explosion-prone liquids.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is sent forth in the appended claims:

1. An inner lining for a tank for holding a liquid selected from a liquid group including easily flammable and explosive liquids, said inner lining being resistant to said liquid and comprising a single continuous flexible envelope (6) prefabricated in accordance with a shape of said tank and provided with welded seams, and wherein said envelope (6) has, on an outer side thereof, an outer layer (6a) which is diffusion-proof against diffusion of said liquid and, on an inner side thereof, an electrically conductive inner layer (6b) having a surface and conduction resistance of not greater than from $10^5$ to $10^8$ Ohms, and said outer layer (6a) has a greater thickness than said electrically conductive inner layer (6b).

2. The inner lining according to claim 1, wherein said surface and conduction resistance is at most $10^5$ Ohm.

3. The inner lining according to claim 1, wherein said outer layer (6a) is a thermoplastic polyurethane ester foil.

4. The inner lining according to claim 1, wherein said outer layer (6a) has a thickness of approximately 600 $\mu$ to 700 $\mu$.

5. The inner lining according to claim 4, wherein said inner layer (6b) is a polyaniline or carbon black coating applied to the outer layer (6a).

6. The inner lining according to claim 1, wherein said inner layer (6b) is a polyurethane ether foil including added carbon black.

7. The inner lining according to claim 1, wherein said outer layer (6a) is a fluoroplastic foil.

8. The inner lining according to claim 7, wherein said outer layer (6a) has a thickness of approximately 400 $\mu$ to 500 $\mu$.

9. The inner lining according to claim 8, wherein said inner layer (6b) is a polyaniline or carbon black coating applied to the outer layer (6a).

10. The inner lining according to claim 9, wherein said inner layer (6b) has a thickness of approximately 2 to 150 $\mu$.

11. The inner lining according to claim 9, wherein said inner layer (6b) is made of said polyaniline by a method comprising the steps of preparing a polyaniline dispersion, applying the polyaniline dispersion to a foil and subsequently heating.

12. The inner lining according to claim 1, wherein said single continuous flexible envelope (6) comprises two foils corresponding to said inner and outer layers united with each other by doubling.

13. The inner lining according to claim 1, further comprising an air-permeable and electrically-conductive intermediate layer (5) between said envelope (6) and an inner wall of said tank and wherein said envelope (6) contacts said intermediate layer with said outer layer (6), said outer layer being diffusion-proof against diffusion by said liquid.

14. The inner lining according to claim 1, wherein said liquid is gasoline and said outer layer is diffusion-proof to diffusion of said gasoline through said outer layer.

15. A tank for holding a liquid selected from a liquid group including easily flammable and explosive liquids, said tank comprising an interior wall and an inner lining covering said interior wall, wherein said inner lining is resistant to said liquid and comprises a single continuous flexible envelope (6) prefabricated in accordance with a shape of said tank and provided with welded seams, and wherein said envelope (6), on an outer side thereof, has an outer layer (6a) which is diffusion-proof against diffusion of said liquid and, on an inner side thereof, an electrically conductive outer layer (6b), and wherein said outer layer (6a) has a surface and conduction resistance of not greater than from $10^5$ to $10^8$ Ohms, and said outer layer (6a) has a greater thickness than said electrically conductive inner layer (6b).

16. The tank according to claim 15, further comprising a dome (2) and an electrically conductive bracket (10) passing through said dome (2) to an outside region and wherein said electrically conductive outer layer (6a) is grounded by connection to said bracket (10).

17. The tank according to claim 15, wherein said envelope (6) comprises a plurality of sections joined together along said welded seams by welding.

18. The tank according to claim 15, wherein said liquid is gasoline and said outer layer is diffusion-proof to diffusion of said gasoline through said outer layer.

* * * * *